H. W. BELTER.
APPARATUS FOR TURNING AND SECURING CHANNEL LIPS OF WELT INSOLES.
APPLICATION FILED OCT. 21, 1916.

1,250,776. Patented Dec. 18, 1917.

UNITED STATES PATENT OFFICE.

HENRY W. BELTER, OF MILWAUKEE, WISCONSIN.

APPARATUS FOR TURNING AND SECURING CHANNEL-LIPS OF WELT-INSOLES.

1,250,776.  Specification of Letters Patent.  Patented Dec. 18, 1917.

Application filed October 21, 1916. Serial No. 126,859.

*To all whom it may concern:*

Be it known that I, HENRY W. BELTER, a citizen of the United States, and resident of Milwaukee, in the county of Milwaukee and State of Wisconsin, have invented certain new and useful Improvements in Apparatus for Turning and Securing Channel-Lips of Welt-Insoles; and I do hereby declare that the following is a full, clear, and exact description thereof.

The present invention relates to new and useful improvements in means for manipulating that type of welt insoles having inner and outer channel lip portions cut therefrom, and adapted to be turned outwardly from the body of the sole and secured together to properly adapt the sole for association with a shoe structure.

It is primarily the object of the present invention to improve the method of turning up and securing the channel lips together, and it is more specifically an object to provide an arrangement for simultaneously turning up both the channel lips of a welt insole, whereby during the turning operation the channel lips are disposed in juxtaposed position for the operation of a simultaneously acting means for securing the lips together in their out-turned positions.

It is further an object to provide a means for procuring a pressing engagement of the channel lips as they are turned outwardly which serves to set a facing of glue which is previously applied to the faces of said lips.

It is still further an object of the invention to provide a device for effecting the simultaneous turning and securement of the channel lips which may be applied to the common types of channel lip turners now on the market, and adapted for turning only one lip of a welt insole.

With the above and other objects and advantages in view the invention resides more particularly in the novel combination, arrangement and formation of parts more particularly hereinafter described and pointed out in the appended claim.

Figure 1:
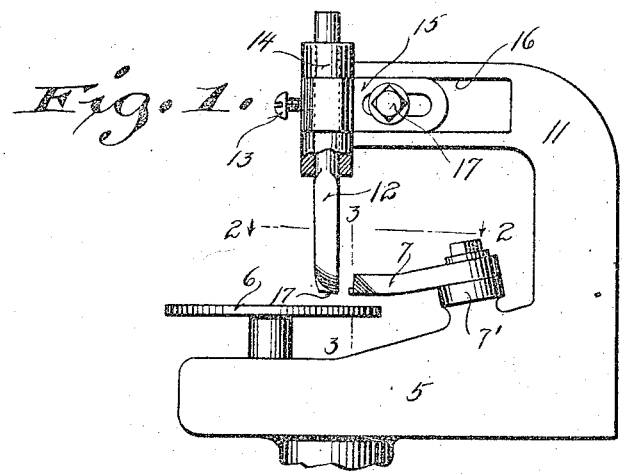
Figure 1 is a partly conventional elevational type view of a lip turning machine of the Goodyear type having my improved second lip turning attachment secured thereto.
Figure 2:
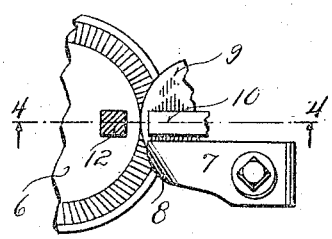
Fig. 2 is a transverse sectional view through the machine on the line 2—2 of Fig. 1, showing the plan relation of the feeding disks and turning fingers.
Figure 4:
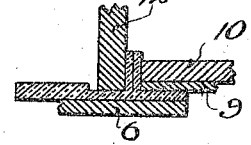
Fig. 4 is a sectional view showing the double welt insole inserted in the machine, the plane of this view being indicated by the line 4—4 of Fig. 2.
Figure 3:
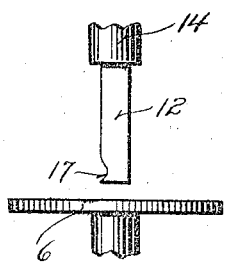
Fig. 3 is a sectional view on the line 3—3 of Fig. 1 showing in side elevation the lip turning bar of my attachment.

Referring now more particularly to the accompanying drawings, 5 designates generally the frame of a lip turner of the Goodyear type, which is provided with a horizontally driven feeding disk 6 having the peripheral portion of its top face suitably roughened to grip the sole, and adjustably carried by an upstanding boss 6' of the frame at the inner side is a lip turning finger 7 having its front portion adjacent the feeding disk curved and beveled at 8 to engage under and turn the outer lip of a welt insole. This finger overlaps the feeding disk 6 and has its end projecting over said disk spaced there above a distance substantially equal to the width of a sole and is further positioned in advance of the transverse axial plane of the feeding disk. Disposed rearwardly of the finger 8 is the usual upper feeding disk 9 and slidable over this feeding disk in the direction radially thereof, and of the main feeding disk 6 is a hammer 10 actuated for reciprocal movement by a suitable mechanism not shown, all of these structures being of the conventional nature embodied in such machines and the hammer 10 being adapted to set a single lip in an upwardly and inwardly turned position, suitable means being provided to assist in feeding the sole inwardly to the hammer.

In applying my improved attachment, this inward feeding means is removed. My attachment comprises a bar 12 adjustably held by a set screw 13 within the sleeve 14 which carries a lateral longitudinally slotted ear 15 seating in the channel 16 of the horizontal portion of the arm 11 and adjustably held in the channel by the clamping bolt 17 passed through the slot of the ear and through the arm 11. Thus the bar may be adjusted both vertically and horizontally to position its lower end in a desired position spaced above the feeding disk 6, and inwardly of the turning arm 8 and hammer 10. The forward face of the bar 12 is cut away to define a turning finger 17 presenting an inclined surface intersecting the forward edge of the bottom of the bar and adapted to engage under the upwardly turned inner channel lip of the welt insole. The side face of the bar 12 adjacent the hammer is flat and thus as the lips of the insole move there-past in their juxtaposed upturned position the hammer 10 will strike said lips to press them together and against the flat face of the bar 12 whereby upon the application of glue to the lips prior to their turning application said lips will be firmly glued together.

An important feature of the present invention is the provision of a relatively small means engaging the inner channel lip whereby in relatively pointed insoles, the said means may properly engage in the front corners thereof. The cutting away of the forward face of the bar 12 particularly conduces to this result as the inner lip is curved upwardly and then outwardly by the lower and upper faces of said cutaway portion successively.

Thus the turning of both lips and the securement of said lips may be effected in a single operation. The essential feature of the invention consists in simultaneously turning up the channel lips and utilizing the juxtaposition of the lips for the substantially coincident operation of a securing means, and therefore while I have embodied my invention in the present instance as an attachment for a conventional type of machine, adapted to turn only one lip of a welt insole, it will be appreciated that the principles of the invention may be applied in various different manner, and that the spirit of the invention is limited only by the scope of the appended claim.

What is claimed:

In a machine for turning up two lips previously cut in an insole, a frame base having an upwardly and then inwardly extending arm, a pair of feed disks revolubly mounted in the base, a turning finger and hammer cooperating therewith, a sleeve carried by the arm of the frame and having a central bore disposed over one of said disks and being horizontally adjustable, and a bar carried by the sleeve and in opposition to the hammer, said bar being vertically adjustable and having its forward face cut away adjacent its lower end to form a turning portion substantially as described.

In testimony that I claim the foregoing I have hereunto set my hand at Milwaukee, in the county of Milwaukee and State of Wisconsin, in the presence of two witnesses.

HENRY W. BELTER.

Witnesses:
FRANK S. RATCLIFFE,
M. E. DOWNEY.

Copies of this patent may be obtained for five cents each, by addressing the "Commissioner of Patents, Washington, D. C."